Nov. 28, 1961 M. P. LANGENDORF 3,011,030
VOICE ACTUATED RELAY CIRCUIT
Filed Sept. 3, 1957
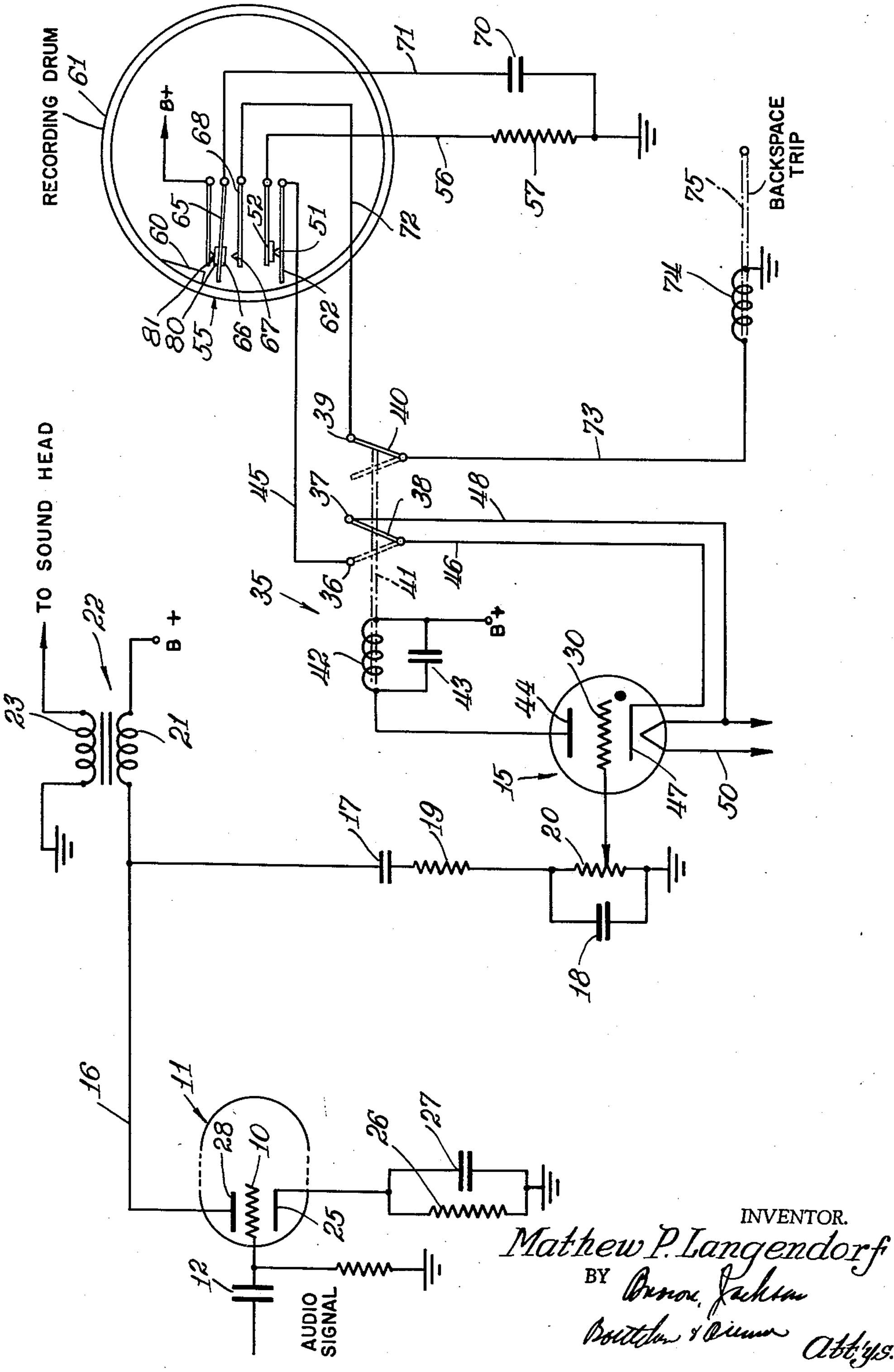
INVENTOR.
Mathew P. Langendorf
BY Brown, Jackson
Boettcher & Dienner Att'ys.

United States Patent Office 3,011,030
Patented Nov. 28, 1961

3,011,030
VOICE ACTUATED RELAY CIRCUIT

Matthew P. Langendorf, Bensonville, Ill., assignor, by mesne assignments, to International Business Machines Corporation, a corporation of New York Filed Sept. 3, 1957, Ser. No. 681,632
8 Claims. (Cl. 179—100.1)

This invention relates to dictating equipment and particularly to an improved system and electrical circuitry for automatically backspacing the sound head of a recording or transcribing machine.

The invention has particular relation to belt-type dictation and transcribing machines which recently have gained in popularity. The invention, in particular, is designed for a magnetic recorder or transcriber using flexible endless recording belts or sleeves. In the normal type of backspacing equipment presently known in this class of recording equipment, the dictator, who wishes to review his work, presses a switch which may electrically energize a solenoid associated with suitable backspacing linkage and mechanism serving to move the magnetic pickup device backwardly a desired distance, as preselected by the manufacturer. Thereafter, a review of the immediately preceding dictation follows. As the magnetic pickup or head of the recording equipment approaches the end of the reviewed dictation, it is not unusual for the operator to over-run the end of the dictation, thereby leaving a blank area in the recording belt. At other times during the course of dictating, frequent pause in the progress of the dictation results in excessive waste of recording medium. The presence of such blank or waste areas, of course, constitutes a loss of total available recording time for a given length of recording medium, thereby decreasing the number of words recorded. It is obviously desirable to prevent an overabundance of blank gaps in the dictating medium caused either by intentional delay of the operator or by accidental or habitual pause during the course of dictating. It is to this latter end that the system and circuitry of the present invention is directed.

Briefly, my invention relates to an audio actuated circuit for controlling automatic operation of a kickback means associated with the recording equipment. The system is so designed that, while audio signals are transmitted and recording thereof occurs, normal operation of the dictating equipment ensues. However, if a gap in the dictation or audio signal arises sufficient, in the preferred embodiment of my invention, to cause a time delay equivalent to the time of travel of one revolution of the sound drum upon which the recording belt or medium is supported, then the circuitry of the invention is suitably actuated to automatically backspace the magnetic pickup head one full line of the recording belt. Thus, blank areas in the recording medium of more than preselected duration are obviated.

The main object of my invention is to provide a new and improved electrical system and circuit for regulating the operation of a magnetic recording mechanism in accordance with predetermined continuity of audio transmission to the magnetic pickup and recording medium.

A further object of my invention is to provide a new and improved audio actuated circuit for use in magnetic recording machines, in particular, which will produce automatic backspacing of the sound of the magnetic pickup head upon interruption of audio input beyond a preselected time interval.

Still another object of my invention is to provide a new and improved circuitry for use in magnetic recording devices, whereby lengthy gaps or blank spaces in the recording medium are avoided.

The above and further objects, features, and advantages of this invention will appear to those familiar in the art from the following detailed description and the illustration of a simplified circuit embodying my invention as appears in the accompanying drawings.

In the drawings, the single figure constitutes a diagrammatic showing of circuit features and elements arranged according to the concepts and teachings of my invention.

Turning now to the aspects of the improved circuitry shown, it will be understood that audio input signals are impressed on grid 10 of a triode vacuum tube 11 over a grid capacitor network 12 of known characteristics. Tube 11 may be a 12BH7 type for amplifying the audio signal which is then fed over conductor 16 and an R-C network, composed of capacitors 17 and 18 and resistances 19 and 20, to the grid of a second vacuum tube 15. Typically, resistances 19 and 20 may be in the order of 500K ohms, with the capacitors 17 and 18 having values of 5000 mmfd. and 120 mmfd., respectively. Tube 15 may be a commercially available type identified as a 5696 tube.

Because a 5696 tube is a gas tube of the thyratron type, application of only a momentary audio signal thereto renders this tube conductive to effect the operation of relay 35, as will be described hereinafter, and complete a holding circuit to maintain the gas tube conductive, notwithstanding termination of the applied audio signal. Thus tube 15 can be said to be a detector, providing a sustaining indication of an audio signal momentarily applied thereto.

The amplified signal from vacuum tube 11 is also fed to primary coil 21 of a standard transformer 22 whose secondary winding 23 supplies the magnetic pickup of the recording machine (not shown). Cathode 25 of tube 11 is coupled conventionally to ground over a bias network, including paralleled resistance 26 and capacitor 27, according to known practice. Plate 28 of tube 11 is connected over the primary coil 21 of transformer 22 to a B+ source which may be in the order of 300 volts D.-C., as supplied by a 6X4 rectifier tube, for example.

The network including resistors 19 and 20 and capacitor 18 serves as a de-emphasis network for attenuating the background noise of the audio input signal, as, for example, when the signal is fed to the recording medium over a telephone network. Resistor 20 is variable and constitutes a sensitivity control for the voice actuated stage; the same is balanced with grid 30 of the vacuum tube 15. In this respect, audio signals of a proper and preselected level are fed to the grid 30 of tube 15, as regulated by the adjustment of resistance 20, thereby causing such tube to conduct current through a control relay, indicated generally by numeral 35.

Relay 35 includes contact pairs 36, 37 associated with switch blade 38 and contact 39 related with switch blade 40. Armature 41, connected to the switch blades 38 and 40, is actuated by a relay coil 42 coupled in parallel with a 5 mfd. capacitor 43 and in series with plate 44 of tube 15 and the B+ power source.

The current conducted to relay coil 42 causes the relay to energize and move the switch blade 38 to its dotted-line position across contact 36, thereby associating conductors 45 and 46; the latter being related to cathode 47 of tube 15. When in its full-line position, switch blade 38 is coupled to conductor 48 and cathode 47 is at the same potential as is heater 50.

With switch blade 38 across contact 36, current is fed through conductor 45 to closed contacts 51, 52 in a switch assembly 55; such contacts are coupled to ground over conductor 56 and a 4000 ohm resistor 57. Tube 15 then continues to conduct until contacts 51 and 52 are momentarily separated by actuator 60 which is associated with and revolves with the recording drum 61 of the recording machine. This momentary opening of the switch assembly 55 is brought about by engagement between the switch actuator 60 and a flexible contact supporting leaf member 62 supporting contact 51. When contacts 51 and 52 are thus separated, relay 35 is de-energized, causing relay switch blade 40 to close with contact 39. This action prepares a backspacing circuit including kickback solenoid coil 74 for operation at a later time as movable switch blade 65 of the switch assembly 55 moves contact 66 thereon into engagement with contact 67 carried by a stationary switch blade 68 upon its subsequent engagement with actuator 60. If no audio signal appears for substantially one complete revolution of the sound drum, actuator 60 will cause contacts 66 and 67 to be engaged and condenser 70 will then discharge through the conductor 71 across the closed cantacts 66, 67, conductor 72, contact 39, switch blade 40, conductor 73, and a kickback solenoid coil 74 to actuate the latter's core member 75. The core member 75 is mechanically coupled, as previously related, to a suitable backspacing mechanism associated with the recording equipment, thereby serving to automatically backspace the magnetic pickup or recording head. In the preferred embodiment shown, a distance equivalent to one completion revolution on the recording drum is selected as the maximum permissible pause time before automatic backspacing occurs. Each time the kickback solenoid is so energized, the recording sound head thus retracts or reverses one full line of dictation. The backspacing circuit comprises capacitor 70, contacts 66, 67, contacts 39, 40 and solenoid 74. Capacitor 70 is maintained charged over a circuit extending from B+, over contacts 80, 81, and capacitor 70 to ground, and the capacitor is connected in the backspacing circuit once in each rotation of the recording drum. That is, with reference to the rotation of recording drum 61, movement of the affixed actuator 60 relative to the contacts 51, 52; 66, 67 provides a reference for operation of the system. The initiation or marking of the beginning of a first predetermined measured interval may be considered to occur as the actuator in its rotational movement engages leaf spring 62 and separates contacts 51, 52 to interrupt the holding circuit for tube 15 and relay 35, the relay 35 being thereby restored to close contacts 39, 40 and complete a portion of the backspacing circuit. The end of such interval and the beginning of the next interval is marked with the next engagement of actuator 60 and leaf spring 62.

A second predetermined measured interval, shorter than the first, is also commenced with engagement of leaf spring 62 by actuator 60, and is terminated as the actuator in its rotation engages leaf spring 65 to close contacts 66, 67. In the event that an audio signal has been received, even momentarily, during the second measured interval, the tube 15 fires and the relay 35 operates and is held over its holding circuit, and at its contacts 39, 40 further interrupts the backspacing circuit to prevent operation of backspacing solenoid 74 by the energy in capacitor 70 as contacts 66, 67 are closed at the end of the second measured interval.

However, if no audio signal has been reecived during the second measured interval, then relay 15 is in the restored condition and contacts 39, 40 are closed at the end of the second measured interval as actuator 60 operates contacts 66, 67 to complete the backspacing circuit which extends the potential from capacitor 70 to backspacing solenoid 74 to operate the same.

It will be understood, therefore, that I have provided a new and improved system and circuitry for accomplishing auatomatic reversing or kickback activity of the recording head in a magnetic recording machine, although the same system and circuitry may be adapted obviously for use with other types of recording equipment. In this respect, however, I find that the use of a magnetic belt and recording head permits quicker backspacing and, therefore, a more efficient operation. By regulating the blank interval or pause time permitted without the transmission of audio signal through the circuit to one full revolution of the sound drum, I have effectively restricted such pause time to a single line on the recording belt. Such automatic backspacing with the operation of this circuit is also capable of regulation to other desired recording times or distances on the recording belt, as, for example, two or more, or partial lines of recording, as desired. Other variations from the system and circuitry shown, however, will be readily apparent to those familiar with the art, according to recognized principles.

It will be appreciated also that it is necessary for the operator to impress audio signals on this circuit to prevent the automatic kickback operation, and that the presence of a regulating resistance, such as resistor 20 of the R-C network associated with tube 15, assures proper operation of the recording head by requiring a designated sound level of the audio signal for recording operation of the equipment. If such a signal is not provided, the automatic kickback feature, and particularly the operation of relay assembly 35 and switch assembly 55, will continue to actuate the kickback solenoid coil 74, as described condenser 70 receiving additional charges from the B+ power source over closed contacts 80, 81.

From the foregoing, those familiar with the art will recognize that I have herein presented a new and improved circuit and control system for dictating equipment which constitutes an improved advancement over prior known circuits and systems of this character. Further, while I have herein described and illustrated my invention with respect and relation to a desired and preferred circuitry and mode of operation, numerous changes, modifications, and substitutions of equivalents may be resorted to therein without necessarily departing from the spirit and scope of my invention. As a consequence, it is not my intention to be limited to the particulars of the descriptive materials herein, except as may appear in the following appended claims.

I claim:

1. A voice actuated control system for automatically backspacing the recording head of a recording machine having a support means for receiving a recording medium, movement of said support means being effective to displace said recording medium relative to said recording head, comprising, amplifier means for amplifying audio signals as received over an input circuit, relay means including a first switch means, means connecting said relay for operation by said signals as amplified to a predetermined intensity to open said first switch means, backspacing means coupled to said first switch means, means including actuator means for restoring said relay means after each movement of said support means through a predetermined measured interval relative to said recording head, and second switch means coupled to said first switch means and connected for operation by said actuator means to energize the backspacing means in response to a predetermined movement of said support means less than said predetermined measured interval following restoration of said relay means and closure of said first switch means.

2. The combination as set forth in claim 1 wherein said first switch means is in the closed position upon the failure of said relay means to receive audio signals of preselected intensity and said second switch means is closed once for each revolution of said support means beneath the recording head, and said backspacing means includes an electrically operated solenoid responsively energized at the closure of said first and second switch means, respectively.

3. A voice actuated circuit for use in dictating equipment employing a drum for supporting a belt-type recording medium, comprising, means for amplifying input audio signals, relay means connected for operation responsive to receipt of amplified audio signals of preselected intensity, means for selectively adjusting the sensitivity of the said relay means to preselect the intensity required to actuate said relay means, first and second switch means controlled by said relay means, third and fourth switch means controlled by rotational operation of the belt supporting drum of the dictating equipment, and a solenoid actuated backspacing means in circuit with said second and fourth switch means for automatically backspacing the sound head upon operation of said second and fourth switch means, said first and second switch means being operated by deenergization of said relay means and said third and fourth switch means being operated at a specified point in the rotation of the belt supporting drum whereby automatic backspacing of the sound head occurs upon failure to transmit audio signals to said relay means within a specified and preselected time interval as determined by the rate of revolution of the belt supporting drum.

4. For use in recording equipment having a recording medium and recording head, at least one of which is displaced in effecting relative movement between said medium and said head, and including back-spacing means for reversing such relative movement, a system for controlling operation of said backspacing means comprising: an audio-responsive means including audio-signal detector means, an energizing circuit for preparing said detector means for operation, means for applying audio signals to said detector means to actuate said detector means from a first stable state to a second stable state, and a holding circuit coupled to and completed by said detector means for maintaining same in said second stable state after actuation thereto; means including an actuator for measuring movement of said recording medium over a predetermined interval, including means for interrupting and reclosing said holding circuit at the beginning of each measured interval whereby in the absence of audio signals said detector means remains in said first stable state subsequent to said reclosure and responsive to receipt of audio signals, said detector means is operated to said second stable state subsequent to said reclosure; and means including said actuator for enabling said backspacing means only in response to said audio signal detector means being in said stable first state during a predetermined portion of said measured interval.

5. For use in recording equipment having a recording medium member and recording head member for recording audio signals received over an input circuit, at least one of which member is displaced in effecting relative movement between said medium and said head, and including backspacing means for reversing such relative movement, a system for controlling operation of said backspacing means comprising: an audio-responsive means including a gas tube having a control element coupled to said input circuit to effect conduction of said tube responsive to the occurrence of audio signals in said input circuit, a relay having a first switch means controlled thereby and having a winding coupled to said gas tube for actuation from a first stable state in which said first switch means is closed to a stable second state in which said first switch means is open responsive to conduction of said gas tube, and a second switch means on said relay for completing a holding circuit for maintaining said tube conductive after application of said audio signals thereto; means including an actuator for measuring a predetermined time period related to a predetermined increment of movement of said recording medium relative to said recording head including means for interrupting and reclosing said holding circuit at the beginning of each measured increment whereby in the absence of audio signals said gas tube remains nonconductive subsequent to said reclosure and said gas tube is operative to conduct subsequent to said reclosure with the presence of audio signals; and means including said actuator connected to energize said backspacing means only in response to said relay remaining in said first state from the beginning of said predetermined period to substantially the end thereof.

6. For use in a recording machine having a recording head member and a sound head member including means for effecting movement of at least one of the members relative to the other in the recording of audio signals received over an input circuit, switching means operative from a first stable condition to a second stable condition responsive to the receipt of said audio signals, means for measuring a given increment of movement of one of said members in a given direction including actuator means for actuating said switching means to said first stable condition at the start of each of said measurements, backspacing means for backspacing said recording medium, means including said actuator means for operating said backspacing means with a predetermined interval of movement of said one member after the start of each of said measured increments, and circuit controlling means on said switching means for disabling said backspacing means with the operation of said switching means to said second stable condition prior to movement of said one member through said predetermined interval.

7. For use in recording equipment having an input circuit over which audio signals are received, a recording member, a recording head member, means for effecting movement of at least one of said members relative to the other in the recording of the received audio signals on said recording member, and backspacing means for reversing the relative movement of said members with each operation thereof, a system for automatically controlling operation of said backspacing means to effect a given backspacing movement in the absence of audio signals for a predetermined movement of said one member, comprising: audio responsive means coupled to said input circuit for operation from a first stable condition to a second stable condition to mark the receipt of any audio signals over said input circuit, measuring means for measuring a first interval of movement of said recording member relative to said recording head member including actuator means for operating said audio responsive means to said first stable condition of operation at the beginning of each of said intervals, first circuit controlling means for operation by said actuator means to enable said backspacing means responsive to relative movement between said members over a second measured interval which is initiated simultaneously with and extends for a distance less than said first interval, and second circuit controlling means controlled by said audio responsive means to disable said backspacing means responsive to receipt of audio signals during said second measured interval.

8. In a recording machine having a recording drum for supporting a recording medium, movement of said drum being effective to displace said recording medium relative to said recording head, a control system comprising: input means for receiving audio signals; audio responsive means coupled to said input means including relay means connected for operation from a first stable state to a second stable state with audio signals on said input circuit, and a first and a second switching means operated by said relay; an actuator affixed to said drum for movement with the drum in its rotation; a holding circuit for said relay means completed over said first switching means with operation of said relay to said second state; a third switching means connected in said holding circuit mounted in the path of movement of said actuator for operation by said actuator once in each revolution of said drum; backspacing means for effecting backspacing between said recording medium and said sound head; a fourth switching means mounted in the path of travel of said actuator for operation thereby with movement of the drum through less than one complete revolution subsequent to operation of said third switching means to enable said backspacing means; and means connecting said second switching means to prevent enablement of said backspacing means by said fourth switching means with said relay means in said second stable state as said fourth switching means is operated by said actuator.

References Cited in the file of this patent

UNITED STATES PATENTS

| | | |
|---|---|---|
| 2,553,410 | Handschin | May 15, 1951 |
| 2,766,323 | Handschin | Oct. 9, 1956 |